US009565624B2

(12) United States Patent
Liu et al.

(10) Patent No.: US 9,565,624 B2
(45) Date of Patent: Feb. 7, 2017

(54) SELECTIVE SCANNING FOR LEGACY RADIO COVERAGE IN IDLE MODE

(71) Applicant: T-Mobile USA, Inc., Bellevue, WA (US)

(72) Inventors: Jun Liu, Issaquah, WA (US); Karri Mikael Kuoppamaki, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/681,638

(22) Filed: Apr. 8, 2015

(65) Prior Publication Data

US 2016/0119858 A1 Apr. 28, 2016

Related U.S. Application Data

(60) Provisional application No. 62/069,150, filed on Oct. 27, 2014.

(51) Int. Cl.
*H04W 48/16* (2009.01)
*H04W 4/22* (2009.01)
*H04W 76/00* (2009.01)
*H04W 36/00* (2009.01)

(52) U.S. Cl.
CPC ............... *H04W 48/16* (2013.01); *H04W 4/22* (2013.01); *H04W 36/0083* (2013.01); *H04W 76/007* (2013.01); *H04W 36/0022* (2013.01)

(58) Field of Classification Search
CPC ..................................................... H04W 48/16
USPC ........................................................ 455/434
See application file for complete search history.

(56) References Cited

U.S. PATENT DOCUMENTS

| 2011/0002268 | A1* | 1/2011 | Dwyer | H04W 36/0022 370/328 |
| 2011/0249624 | A1* | 10/2011 | Ramachandran | H04W 48/18 370/328 |
| 2013/0315072 | A1* | 11/2013 | Hietalahti | H04W 76/02 370/242 |
| 2014/0219272 | A1* | 8/2014 | Shuman | H04L 65/1016 370/352 |
| 2014/0233529 | A1* | 8/2014 | Prakash | H04W 36/0022 370/331 |
| 2015/0245388 | A1* | 8/2015 | Yerrabommanahalli | H04W 76/007 455/404.1 |

OTHER PUBLICATIONS

PCT Search Report and Written Opinion for PCT Application No. PCT/US15/55160, mailed Jan. 4, 2016, 11 pages.

* cited by examiner

*Primary Examiner* — Michael Neff
(74) *Attorney, Agent, or Firm* — Lee & Hayes, PLLC

(57) ABSTRACT

A mobile device may implement an idle mode process in order to selectively scan for legacy radio coverage using a timer-based scanning process. A mobile device may operate in idle mode and may establish a long term evolution (LTE) radio link with a nearby cell site. The idle mode process implemented by the mobile device may include evaluating one or more criteria that are indicative of whether the mobile device is capable of providing sufficient voice service capabilities using voice over LTE (VoLTE). Based on the criteria evaluation, a timer-based scanning process may be initiated. When the timer-based scanning process is initiated, the mobile device may scan for legacy radio coverage periodically. If no legacy radio coverage is available, the mobile device may indicate that voice services are unavailable.

13 Claims, 4 Drawing Sheets

SELECTIVE SCANNING FOR LEGACY RADIO COVERAGE IN IDLE MODE

RELATED APPLICATIONS

This U.S. patent application claims priority to provisional U.S. patent application No. 62/069,150, entitled "UE PROCEDURES UNDER LTE ONLY COVERAGE," and filed on Oct. 27, 2014, the entirety of which is incorporated herein by reference.

BACKGROUND

Cellular networks are constantly evolving. For example, fourth generation (4G) Long Term Evolution (LTE) networks have evolved from third generation (3G), and second generation (2G) radio access technology (RAT) systems. The $3^{rd}$ Generation Partnership Project (3GPP) LTE standard, in its various releases, is an all-Internet Protocol (all-IP) data transport technology that uses packet-switching for both data and voice communications. By contrast, legacy RAT systems (e.g., 3G/2G) employ circuit-switching for voice communications. Because the evolution of these technologies takes time, cellular networks employ a mixture of newer (e.g., 4G) and legacy (e.g., 3G/2G) RAT systems. Such networks can be thought of as "heterogeneous" cellular networks due to the mixture of legacy and non-legacy technologies.

Mobile devices that are 4G LTE-compliant are configured to communicate within these heterogeneous cellular networks by employing radios that can communicate through the legacy RATs. Generally, 4G LTE-compliant mobile devices are configured to prefer attachment to 4G LTE networks, which offer relatively high data-rate throughput as compared to the legacy radio access networks (RANs). In most mobile devices, a choice of which protocol to employ depends primarily on what RATs are available to the mobile device at its present geographic location. Furthermore, in instances where the preferred 4G LTE RAT is unavailable or unusable, legacy RATs, if available, may be used as a fallback protocol, such as by using a circuit-switch fallback (CSFB) mechanism.

However, with the availability of additional spectrum (e.g., the 700 megahertz (MHz) Band), LTE-based RATs are able to attain better link budget and coverage as compared to legacy RATs due to improved propagation characteristics in the new spectrum. For example, given a single cell site (cell tower), a 700 MHz LTE footprint (i.e., LTE radio coverage area) tends to be larger than the legacy 3G/2G footprint for the same cell site. Without a commensurate enlargement of the legacy 3G/2G footprint, this creates "LTE-only" radio coverage areas (sometimes called "LTE-only areas") where the only available RAT available to the mobile device is the 4G LTE RAT.

When a mobile device is within an LTE-only area, the only way to deliver voice is through a packet-based protocol, such as the voice over LTE (VoLTE) protocol. Accordingly, an LTE-compliant mobile device within an LTE-only area generally indicates that voice service is available on the assumption that VoLTE can be used for voice communications. However, VoLTE may not always be available or usable in LTE-only areas. Consider an example where a mobile device attempts to establish a call over VoLTE in an LTE-only area and a failure occurs that prevents the use of VoLTE for the call, such as a VoLTE outage. In this example, the mobile devices will implement an event-triggered "retry" procedure where the mobile device, upon detecting that the call cannot be established over VoLTE, tries to establish the call on a different, legacy RAT. In this scenario, the mobile device is unaware that there are no fallback RATs available to it, so the mobile device traverses through all of the possible layers, retrying on each, before it ultimately determines that the call cannot be established. A user of such a device may be frustrated by the failed call attempt, and may be further confused by the fact that the mobile device had indicated, before the call attempt, that voice service was available when in fact it was not (i.e., a false voice coverage indication). In emergency situations, a user of the mobile device may be unable to make a phone call to an emergency services telephone number (e.g., 911) in an LTE-only area when VoLTE is turned off.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
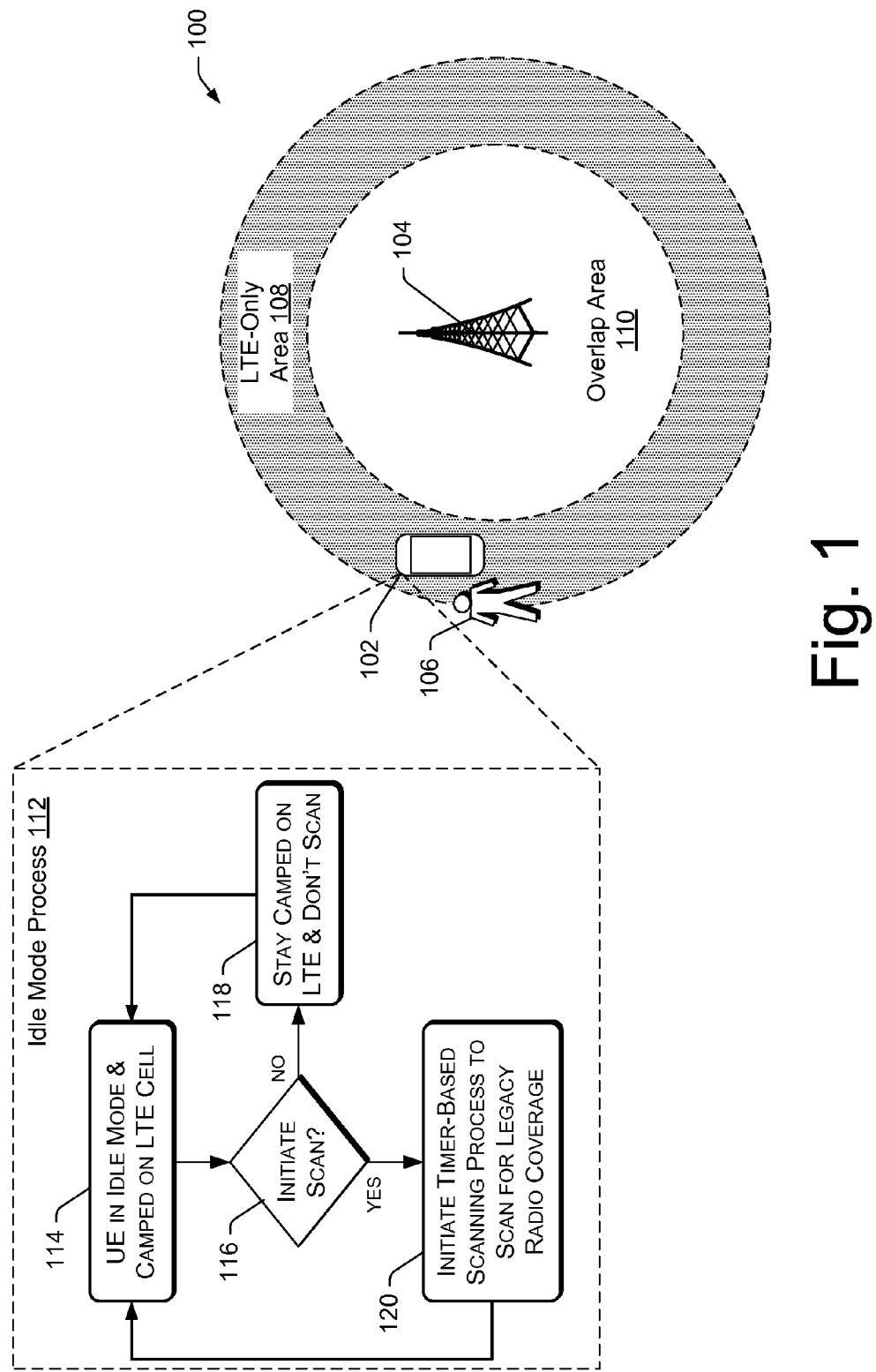
FIG. 1 illustrates an example cellular network environment that supports wireless communications between mobile devices and a cell site, the environment including a mobile device configured to implement an idle mode process according to various embodiments.

Described herein are techniques and systems for implementing an idle mode process on a mobile device in order to selectively scan for legacy radio coverage using a timer-based scanning process. An LTE-compliant mobile device is configured to camp on a proximate cell site that employs LTE radio access using LTE communications protocol. When camped on the LTE-enabled cell site, the mobile device may transmit and/or receive communications to and/or from the cell site. When the mobile device is in an LTE-only area where the only available RAT available to the mobile device is the 4G LTE RAT, the mobile device can use VoLTE to transmit/receive voice communications, but is otherwise unable to use a legacy RAT for voice communications.

According to various embodiments, the mobile device may implement an idle mode process in order to determine whether it needs to be aware of its surroundings (i.e., the availability of legacy radio coverage) or not. In some embodiments, this determination involves evaluating one or more criteria that indicate whether the mobile device is capable of providing sufficient voice service capabilities over VoLTE. If the mobile device determines that being aware of its surroundings provides a positive net-benefit to the mobile device, a timer-based scanning procedure may be implemented to periodically (at regular or irregular time intervals) scan for the availability of legacy radio access technologies (RATs), even in the absence of an event, like a phone call attempt.

In some embodiments, a process to be implemented on a mobile device includes operating a mobile device in idle mode, establishing a LTE radio link between the mobile device and a cell site within communication range of the mobile device, and evaluating one or more of a plurality of criteria to decide whether to initiate a timer-based scanning process to scan for the availability of legacy radio coverage. In response to determining that none of the criteria are met (i.e., determining not to initiate the timer-based scanning process), the mobile device may stay camped on LTE (maintain the LTE radio link), and may provide an indicator indicating that the mobile device has voice service capabilities, all without (refraining from) scanning for availability of legacy coverage from a legacy RAN. In response to determining that at least one criterion is met, the mobile device may initiate the timer-based scanning process by monitoring a timer to determine whether a time period has expired, and upon determining that the time period has expired, the mobile device may scan for availability of legacy coverage from a legacy RAN. If, after scanning for legacy radio coverage, it is determined that legacy radio coverage is not available to the mobile device, the mobile device may provide an indicator indicating that the mobile device does not have voice service capabilities. If, on the other hand, it is determined that legacy radio coverage is available to the mobile device, the mobile device may provide an indicator indicating that the mobile device has voice service capabilities.

Also disclosed herein are systems comprising one or more processors and one or more memories, as well as non-transitory computer-readable media storing computer-executable instructions that, when executed, by one or more processors perform various acts and/or processes disclosed herein.

By implementing a timer-based scanning process selectively in instances where it benefits the mobile device to do so, the processor load on the mobile device is reduced and battery life extended by refraining from performing the timer-based scanning process when it provides little benefit to do so. Furthermore, when the timer-based scanning process is implemented, the timer-based process may execute at a frequency that allows the mobile device to maintain awareness of its surroundings without draining more battery than is necessary and without overloading the processor of the mobile device. Furthermore, a mobile device implementing the idle mode procedure described herein may be able to make wise, proactive decisions regarding what to surface to the user. That is, user experience is improved by accurately indicating whether the mobile device has voice service capabilities before a call is even attempted.

Example Environment

Although the techniques and systems disclosed herein are predominantly described with respect to 4G LTE networks and legacy RATs in terms of 3G and/or 2G RATs, it is to be appreciated that the techniques and systems described herein may be implemented in any future heterogeneous cellular network (e.g., a fifth generation (5G) network where 4G LTE might be considered a legacy RAT with respect to 5G, and so on). Thus, LTE, as it is used herein, may refer to current releases of LTE protocol, or any future evolution of LTE.

FIG. 1 illustrates an example cellular network environment 100 that supports wireless communications between mobile devices, such as the mobile device 102, and a cell site 104. The cell site 104 of FIG. 1 may be configured to employ LTE radio access, and may also employ at least one legacy RAT, such as a 3G RAT and/or a 2G RAT. Accordingly, the cell site 104 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), and/or any future IP-based network technology or evolution of an existing IP-based network technology.

FIG. 1 further illustrates a user 106 who is associated with the mobile device 102. The user 106 may have subscribed to services that a carrier (or cellular network operator) provides to its customers. In this manner, the user 106 (or subscriber) may access services from a core network using the mobile device 102 that communicates with the core network through the cell site 104.

In FIG. 1, the user 106 is carrying the mobile device 102 within an "LTE-only area" 108. The LTE-only area 108 is an area where the mobile device 102 is not within radio coverage of a legacy RAT, such as 3G/2G RATs. Instead, the only RAT available to the mobile device 102 is the 4G LTE RAT employed by the cell site 104. In the example of FIG. 1, the LTE-only area 108 is created because the radio coverage area of the LTE RAT is larger than the radio coverage area of any legacy RAT(s) employed by the cell site 104. Accordingly, an overlap area 110 is also created around the cell site 104 where the legacy radio coverage overlaps with the LTE radio coverage. The result is the overlap area 110 where a heterogeneous cellular network is available to the mobile device 102, and a "ring-shaped" the LTE-only area 108 having homogeneous radio coverage in the form of LTE.

Of course, the user 106 can carry the mobile device 102 with him/her to different locations, so the mobile device 102 may, at some different time, be located within the overlap area 110, or outside (beyond) both the overlap area 110 and the LTE-only area 108. FIG. 1 illustrates the scenario when the mobile device 102 is within the LTE-only area 108 for illustrative purposes.

The mobile device 102 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), and/or any similar mobile device. In accordance with various embodiments described herein, the terms "wireless communication device," "wireless device," "communication device," "mobile device," and "user equipment (UE)" may be used interchangeably herein to describe any mobile device capable of performing the techniques described herein. The mobile device 102 may be capable of communicating wirelessly using any suitable wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE, Institute of Electrical and Electronics Engineers (IEEE) 802.1x protocols, WiMAX, wireless fidelity (Wi-Fi™), and/or any future IP-based network technology or evolution of an existing IP-based network technology.

The mobile device 102 may operate in multiple operating modes. One example mode of operation may be an "active communications mode" where the mobile device 102 is actively communicating with (i.e., transmitting/receiving data to/from) the cell site 104. The mobile device 102 may operate in the active communications mode during a call session, for example. Another example operating mode may be an "idle mode" where the mobile device 102 is not actively communicating with the cell site 104. The mobile device 102 may operate in the idle mode when the user 106 is carrying the mobile device 102 in his/her pocket or a bag and the user 106 is not otherwise using the mobile device 102 for voice or data communications, streaming, or the like. It is to be appreciated that the mobile device 102 may operate in other operating modes, and is not limited to operating in just the two aforementioned operating modes.

In either operating mode (i.e., idle mode or active communications mode), the mobile device 102 may be camped on (or attached to) the cell site 104. When the mobile device 102 and the cell site 104 have established a radio link, the mobile device 102 is said to be "camped on" the cell that is associated with the cell site 104. The mobile device 102 within the LTE-only area 108 may attach to the cell site 104 by performing a registration for a packet-switched LTE network, and may thereby establish a LTE radio link with the cell site 104. In instances where a legacy RAT is available to the mobile device 102 (e.g., if the mobile device 102 were to move within the overlap area 110), the mobile device 102 may attach to the cell site 104 using a "combined attach" procedure where the mobile device 102 performs registration for both a circuit-switch (non-LTE) network and a packet-switched (LTE) network. By being "combined attached" to the cell site 104, the mobile device 102 may implement CSFB so that a legacy RAT can be used for a voice call in the event that VoLTE functionality fails or is rendered unusable.

FIG. 1 further illustrates that the mobile device 102 may be configured to implement an idle mode process 112. The idle mode process 112 may execute as a background process by executing processor-executable instructions stored on the mobile device 102, and may be executed at start-up, and/or at multiple different times (e.g., periodically), and the like. A more detailed process will be discussed below with reference to FIG. 4 according to various embodiments.

At 114, the mobile device 102 may be operating in idle mode and may be camped on a LTE network cell employed by the cell site 104. The mobile device 102 operating in idle mode at 114 may perform a registration for the packet-switched LTE network in order to attach to (camp on) the LTE network cell provided by the cell site 104.

At 116, a client application on the mobile device 102 may determine whether to initiate a timer-based scanning process that scans for legacy radio coverage. At a high level, if the mobile device 102 determines, at 116, that it can provide sufficient voice communications services over LTE (i.e., following the "no" route from 116), the mobile device 102, at step 118, stays camped on LTE and refrains from scanning for legacy radio coverage. In other words, if the mobile device 102 is not reliant on a legacy network for any reason, there is no need to scan for legacy radio coverage. The idle mode process 112 may iterate from 118 by returning to 114 and proceeding to decision block 116.

In some embodiments, the determination at 116 may involve evaluation of one or more of a plurality of criteria including: (i) whether the mobile device 102 is not capable of utilizing VoLTE communications through or with the cell site 104 via a LTE RAT employed by the cell site 104; (ii) whether a VoLTE capability of the mobile device 102 has been turned off; and/or (iii) whether the mobile device 102 is not capable of making a call to an emergency services telephone number (e.g., E911) using VoLTE. If any of the aforementioned criteria are met, the idle mode process 112 may follow the "yes" route from 116, which indicates that the mobile device 102 is at risk of not having voice service capabilities. That is, unless the mobile device 102 can identify an available legacy RAT (e.g., 3G/2G) to "fall back on," it may not be able to provide voice services for the user 106.

Following the "yes" route from decision block 116, the idle mode process 112 may proceed to step 120 where a timer-based scanning process may be initiated to scan for legacy radio coverage. The scanning process at 120 is timer-based in the sense that scanning is executed based on a timer (i.e., expiration of a time interval). In the example of FIG. 1, the mobile device 102 is shown as being located within the LTE-only area 108, and, therefore, the timer-based scanning process, upon execution at 120, may indicate to the mobile device 102 that there is no available legacy radio coverage. As a result, the mobile device 102 may indicate (e.g., on a display of the mobile device 102, a light emitting diode (LED) indicator, etc.) that the mobile device 102 is out of voice coverage (i.e., it does not have voice service capabilities). In the absence of the scanning process at 120, a different mobile device may provide a false coverage indication that the mobile device has LTE coverage when in fact it doesn't. The idle mode process 112 may iterate from 120 by returning to 114 and proceeding to decision block 116.

By implementing the idle mode process 112, the mobile device 102 may selectively scan for legacy radio coverage using a timer-based scanning process at 120 in instances where it benefits the mobile device 102 to initiate the scanning process at 120. In other words, if the mobile device 102 determines that there is a negative net-benefit to performing the scanning at 120 (i.e., the mobile device 102 can provide sufficient voice communications using VoLTE), the idle mode process 112 loops through the "no" route at 116 without going to step 120.

Figure 2:
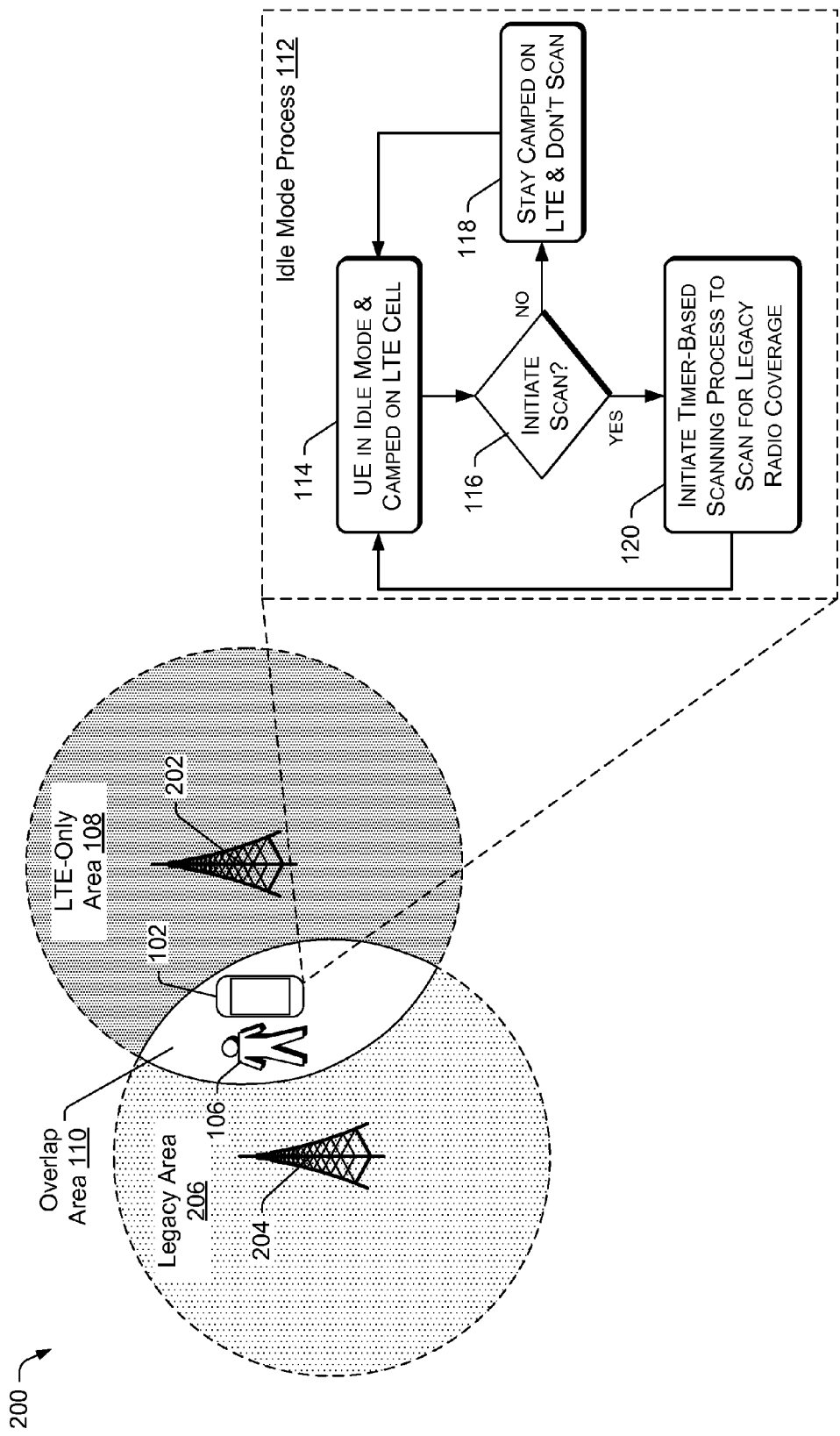
FIG. 2 illustrates an example cellular network environment that supports wireless communications between mobile devices and multiple different cell sites, the environment including a mobile device configured to implement an idle mode process according to various embodiments.

FIG. 2 illustrates an example cellular network environment 200 that supports wireless communications between mobile devices and multiple different cell sites, including cell site 202 and cell site 204. FIG. 2 illustrates a different environment 200 and a different scenario than FIG. 1. First, the cell site 202 may be configured to employ LTE radio access, but may not be configured to employ a legacy RAT, such as 3G or 2G RATs. Thus, the cell site 202 of FIG. 2 illustrates the "green field" scenario where a carrier may have acquired new cell site for LTE, and no legacy layers have been placed underneath the LTE layer. The "green field" scenario is yet another cause for the creation of LTE-only areas, such as the LTE-only area 108.

FIG. 2 further illustrates cell site 204 that may employ at least one legacy RAT, such as a 3G RAT and/or a 2G RAT. In the example of FIG. 2, the radio coverage of the legacy RAT(s) provided by the cell site 204 partially overlaps with the radio coverage area of the cell site 202, thereby creating the overlap area 110. The LTE-only area 108 and the overlap area 110, although created differently, may have similar properties and characteristics to those described with reference to FIG. 1. FIG. 2 also shows a legacy area 206 where LTE radio access may or may not exist. For example, a legacy-only cell site 204 may not employ 4G LTE radio access, and in this case, the legacy area 206 may be a legacy-only area. It is to be appreciated that the legacy area may alternatively be a heterogeneous RAT area where both legacy and LTE radio access is available.

The user 106 in FIG. 2 is shown to be carrying his/her mobile device 102 within the overlap area 110, meaning that the mobile device 102 is within coverage of both LTE and legacy RATs. The mobile device 102 may implement the idle mode process 112. In the scenario of FIG. 2, the mobile device 102 may be combined attached to both the LTE network cell provided by the cell site 202 and the circuit-switched legacy network cell provided by the cell site 204.

In a similar fashion to the scenario of FIG. 1, during execution of the idle mode process 112, if the mobile device determines, at 116, that it can provide sufficient voice communications services over LTE (i.e., following the "no" route from 116), the mobile device 102, at step 118, stays camped on LTE via the cell site 202 and refrains from scanning for legacy radio coverage. In other words, if the mobile device 102 is not reliant on a legacy network provided by the cell site 204, there is no need to scan for legacy radio coverage.

However, following the "yes" route from decision block 116 (i.e., the mobile device 102 determines that it may need a legacy RAT to provide sufficient voice communications), the idle mode process 112 may initiate the timer-based scanning process at 120 to scan for legacy radio coverage. In the example of FIG. 2, the mobile device 102 is shown as being located within the overlap area 110, and, therefore, the timer-based scanning process, upon execution at 120, may indicate to the mobile device 102 that legacy radio coverage is available (in this case, from the cell site 204). As a result, the mobile device 102 may indicate (e.g., on a display of the mobile device 102, a LED indicator, etc.) that the mobile device 102 is within voice coverage (i.e., it has voice service capabilities). The indicator provided by the mobile device 102 may vary depending on the type of legacy coverage available to the mobile device 102. For example, if a first carrier (or cellular network operator) provides the LTE coverage using the cell site 202, and a second, different carrier provides legacy 3G/2G coverage using the cell site 204, and if there is no roaming agreement between the first and second carriers, the mobile device 102 may indicate that it has "limited service" and may camp on the cell provided by cell site 204 in a limited service mode, meaning that the mobile device 102 does not have sufficient credentials and/or is not authorized to receive the legacy RAT service for normal calls, but can still make emergency calls (e.g., E911) over the second carrier's legacy RAT system.

It is to be appreciated that although the shapes of the radio coverage areas shown in FIGS. 1 and 2 are circular, the radio coverage footprint from any one or more of the cell sites in FIGS. 1 and 2 may be of any suitable shape, such as square, triangular, hexagonal, or any suitable polygonal shape.

Figure 3:
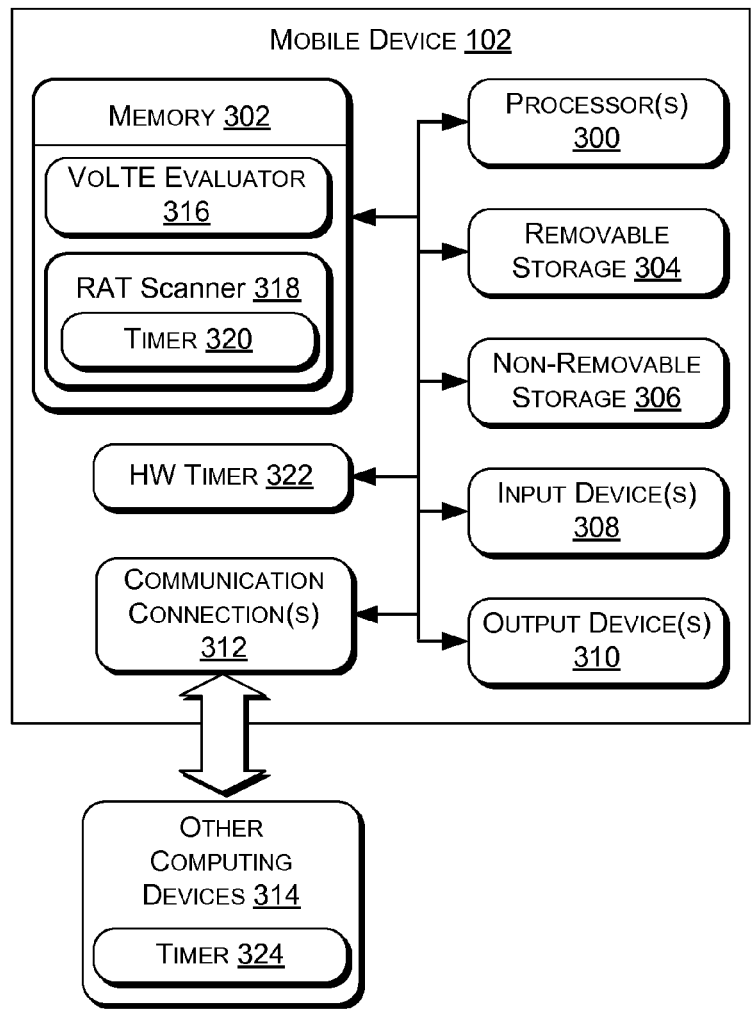
FIG. 3 is a block diagram of an example mobile device architecture in accordance with various embodiments.

FIG. 3 is a block diagram of an example architecture of the mobile device 102 in accordance with various embodiments. As shown, the mobile device 102 may include one or more processors 300 and one or more forms of computer-readable memory 302. The mobile device 102 may also include additional storage devices. Such additional storage may include removable storage 304 and/or non-removable storage 306.

In various embodiments, the computer-readable memory 302 generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 302 may also be described as computer storage media and may include volatile and nonvolatile, removable and non-removable media implemented in any method or technology for storage of information, such as computer readable instructions, data structures, program modules, or other data. Computer-readable memory 302, as well as the removable storage 304 and non-removable storage 306, are all examples of computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 102. Any such computer-readable storage media may be part of the mobile device 102.

The mobile device 102 may further include input devices 308, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 308 coupled communicatively to the processor(s) 300 and the computer-readable memory 302. The mobile device 102 may further include output devices 310, including, without limitation, a display, one or more LED indicators, speakers, a printer, or any other suitable output device coupled communicatively to the processor(s) 300 and the computer-readable memory 302.

The mobile device 102 may further include communications connection(s) 312 that allow the mobile device 102 to communicate with other computing devices 314 such as via a network (e.g., an IP Multimedia Subsystem (IMS) network). The communications connection(s) 312 may facilitate transmitting and receiving wireless signals over any suitable wireless communications/data technology, standard, or protocol, as described above, such as using licensed, semi-licensed, or unlicensed spectrum over a telecommunications network. For example, the communication connection(s) 312 may represent one or more of a cellular radio, a wireless (e.g., IEEE 802.1x-based) interface, a Bluetooth® interface, and so on. In some embodiments, the communications connection(s) 312 may include radio frequency (RF) circuitry that allows the mobile device 102 to transition between different RATs, such as transitioning between communication with a 4G LTE RAT and a legacy RAT (e.g., 3G/2G). The communications connection(s) 312 may further enable the mobile device 102 to communicate over circuit-switch domains and/or packet-switch domains.

In some embodiments, the computer-readable memory 302 may include VoLTE evaluator 316 and a RAT scanner 318, among other possible modules, data structures, and/or processor-readable instructions. The VoLTE evaluator 316 may be configured to evaluate one or more of a plurality of criteria as part of the idle mode process 112. For example, the VoLTE evaluator 316 may evaluate whether the mobile device 102 is not capable of utilizing VoLTE communications through or with a proximately located (within range) cell site via a LTE RAT employed by the cell site. This criterion may be satisfied when the mobile device 102 is not a VoLTE capable device, which may be the case for some older models of mobile devices 102 that are still usable over LTE networks, but operate on a circuit-switch domain for voice calling.

As another example, the VoLTE evaluator 316 may evaluate whether a VoLTE capability of the mobile device 102 has been turned off. For example, the mobile device 102 may allow the user 106 to manually turn off a VoLTE capability of the mobile device 102. In some embodiments, this may be enabled through user input received via the input device(s) 308 (e.g., a touch screen user input, voice command, etc.) to disable the VoLTE capability on the mobile device 102. In other embodiments, the user 106 may access a settings menu to set conditions when the VoLTE capability is to be automatically turned off by the mobile device 102 (e.g., based on location, the availability of a Wi-Fi AP, etc.).

As yet another example, the VoLTE evaluator 316 may evaluate whether the mobile device 102 is not capable of making a call to an emergency services telephone number (e.g., E911) using VoLTE. The reason for evaluating this criterion is due to the fact that, even when the VoLTE capability of the mobile device 102 is turned on, the mobile device 102 may not support E911 because E911 voice communications may be handed over to legacy RATs as opposed to transmitting over VoLTE. This can be an issue for carriers because carriers are to support both regular calls and E911 calls.

If the VoLTE evaluator 316 determines that any of the aforementioned criteria are satisfied/met, it may indicate that the mobile device 102 is at risk of not having voice service capabilities. That is, unless the mobile device 102 can identify an available legacy RAT (e.g., 3G/2G) to "fall back on," it may not be able to provide sufficient voice services for the user 106.

The RAT scanner 318 may be configured to cause the mobile device 102, via the communication connection(s) 312 to scan for legacy radio coverage. The RAT scanner 318 is selectively utilized based on the determination from the VoLTE evaluator 316 as to whether the RAT scanner 318 needs to initiate scanning. If the VoLTE evaluator 316 indicates to the RAT scanner 318 that the availability of legacy radio coverage is to be determined, the RAT scanner 318 may utilize a timer to determine when to scan for legacy radio coverage. In some embodiments, the timer may be implemented on the mobile device 102 in the form of a software-based timer 320 or a hardware-based timer 322 (e.g., a timer implemented via a microcontroller). In other embodiments, the timer may be implemented on a network, such as an IMS network, where the mobile device 102 may monitor a remote timer 324 via the communications connection(s) 312, such as by polling a remote computing resource (e.g., the other computing devices 314), or otherwise receiving a signal or communication as to whether a time period has expired. In the network-provided timer implementation, the network-accessible remote timer 324 may be configured to control a plurality of mobile devices, including the mobile device 102, to enforce a universal or global time period so that the plurality of mobile devices behave similarly in terms of the frequency in which the RAT scanner 318 scans for legacy coverage. The timer 320, 322, or 324 controls the frequency at which the scanning occurs. For example, if the timer-based scanning process is initiated, the RAT scanner 318 may cause scanning for legacy radio coverage every 10 seconds. Any suitable time interval may be chosen and is configurable per the implementation on the mobile device 102.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
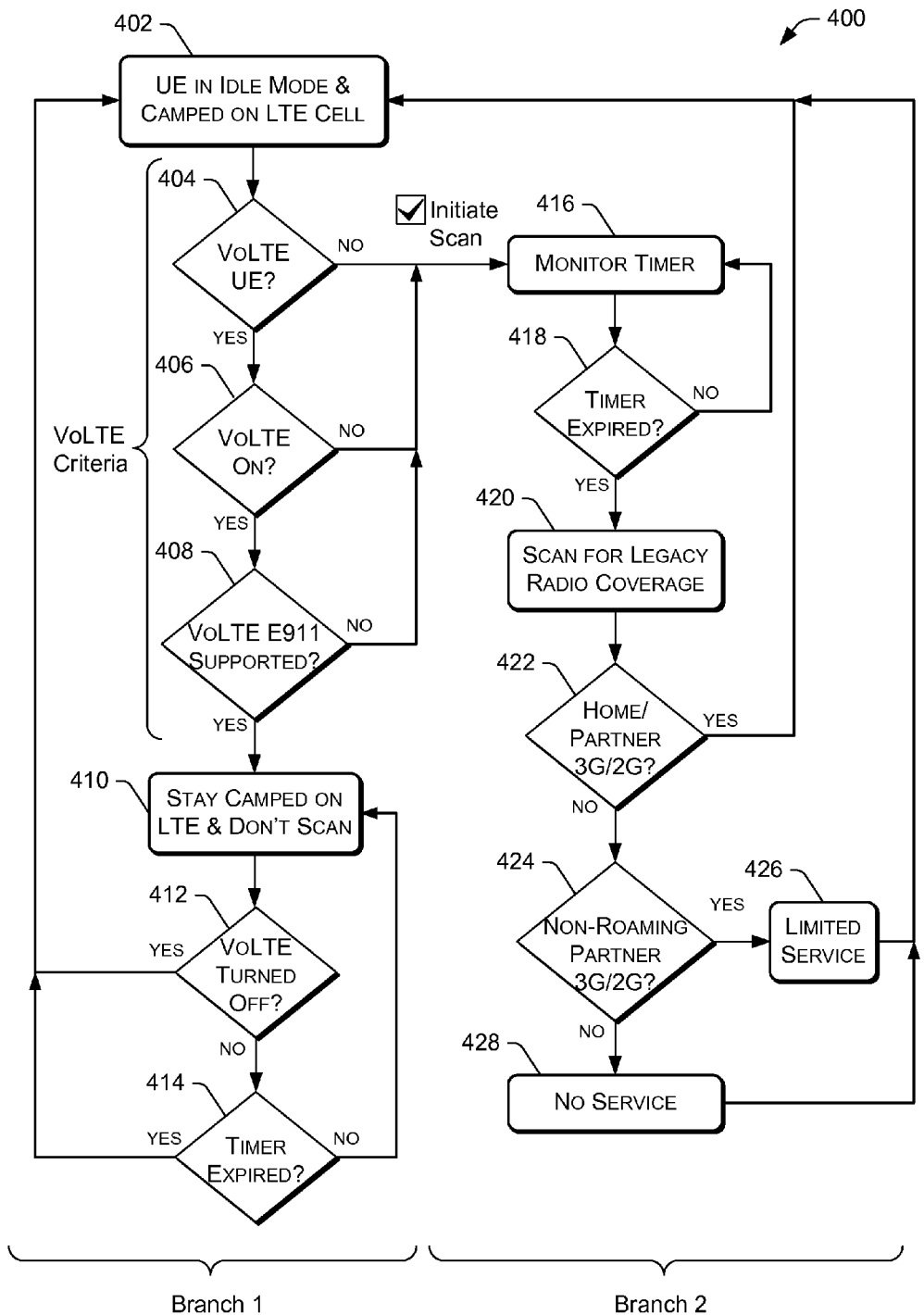
FIG. 4 illustrates a flowchart of an example idle-mode process for selectively scanning for legacy radio coverage.

FIG. 4 illustrates a flowchart of an example idle-mode process 400 for selectively scanning for legacy radio coverage. The process 400 may represent a more detailed process of the idle mode process 112 described with reference to the previous figures. The process 400 may be implemented by the mobile device 102 and relevant components of the mobile device 102, such as the VoLTE evaluator 316, the RAT scanner 318, the software-based timer 320, the hardware-based timer 322, or the remote timer 324, and the communication connection(s) 312, among other components.

At 402, the mobile device 102 may be operating in idle mode and may be camped on a LTE network cell, such as the cell site 104 of FIG. 1 or the cell site 202 of FIG. 2. The mobile device 102 operating in idle mode at 402 may perform a registration for the packet-switched LTE network in order to attach to (camp on) the LTE network cell. In some embodiments a combined attach process may be used to attach the mobile device 102 to both a circuit-switched non-LTE network and a packet-switched LTE network. In some embodiments, upon establishing a radio link with an LTE network cell, the mobile device 102 may provide a default indicator (e.g., a visual indicator provided on the display, an LED indicator, etc.) indicating that the mobile device 102 is within coverage for voice and data communications.

At decision blocks 404, 406, and 408, the VoLTE evaluator 316 may evaluate various criteria in order to determine whether to initiate a timer-based scanning process that scans for legacy radio coverage. At a high level, if the VoLTE evaluator 316 determines, at 404-408, that it can provide sufficient voice communications services over LTE, the idle mode process 400 stays within Branch 1 by refraining from scanning for legacy radio coverage and staying camped on the LTE network cell. Otherwise, the idle mode process 400 moves to Branch 2 to initiate the timer-based scanning process if the VoLTE evaluator 316 determines that the mobile device 102 may be reliant on a legacy network for voice communications.

At 404, the VoLTE evaluator 316 may evaluate whether the mobile device 102 is capable of utilizing VoLTE communications through or with a cell site that employs the LTE RAT the mobile device 102 is camped on. If not, (e.g., the mobile device 102 is an older device that does not support VoLTE communications for voice), the process 400 may proceed to Branch 2. If the mobile device 102 is capable of utilizing VoLTE, the process 400 may proceed to 406.

At 406, the VoLTE evaluator 316 may evaluate whether a VoLTE capability of the mobile device 102 has been turned off (e.g., by the user 106 via user input, by the device 102 due to a control setting, etc.). If the VoLTE capability is off, the process 400 may proceed to Branch 2. If the VoLTE capability is on, the process 400 may proceed to 408.

At 408, the VoLTE evaluator 316 may evaluate whether the mobile device 102 is capable of making a call to an emergency services telephone number (e.g., E911) using VoLTE. If not, the process 400 may proceed to Branch 2. If the mobile device 102 is capable of utilizing VoLTE for emergency calls, the process 400 may proceed to 410.

At 410, having determined that there is a negative net-benefit to scanning for legacy radio coverage, the mobile device 102 may continue to provide an indicator (e.g., a display indicator) indicating that the mobile device 102 that the mobile device 102 has sufficient voice service capabilities and can, when needed, establish voice communications over VoLTE. The mobile device 410 also refrains from scanning for legacy radio coverage by avoiding Branch 2.

At 412, a determination may be made as to whether the VoLTE capability has been turned off on the mobile device 102. For example, the user 106 may manually (e.g., via touch screen user input) turn off the VoLTE capability on the mobile device 102. If the toggling of the VoLTE capability to "off" is detected at 412, the process 400 iterates by returning to 402.

At 414, so long as the VoLTE capability remains turned "on" and is enabled, a timer may be monitored to determine whether a time period has expired. If not, the process 400 may loop back to 410 in order to proceed through decision blocks 412 and 414 again. Once the timer expires at 414, the process 400 may iterate by returning to 402 so that the criteria can be evaluated again at 404-408. In this manner, the idle mode process 400 may stay within Branch 1 so long as sufficient VoLTE capabilities are available for voice communications.

Returning again to the "no" routes from decision blocks 404-408, if the VoLTE evaluator 316 determines that the "no" route for any one of the criteria at 404-408 is to be followed, the idle mode process 400 initiates a timer-based scanning process represented by Branch 2 shown in FIG. 4. Branch 2 is initiated when it is determined that the mobile device 102 is at risk of not having voice service capabilities. That is, unless the mobile device 102 can identify an available legacy RAT (e.g., 3G/2G) to "fall back on," it may not be able to provide voice services for the user 106.

At 416, a timer, such as the software-based timer 320, the hardware-based timer 322, or the remote timer 324, may be monitored, and at 418, a determination is made as to whether the timer 320, 322, or 324 has expired. If the timer has not expired, the process 400 iterates back to 416 and loops until it is determined at 418 that the timer has expired. In this manner, battery of the mobile device 102 may be conserved by selecting a scanning frequency, as implemented by the time period monitored at 416, that high enough to maintain awareness of legacy radio coverage, but not so high that battery is unnecessarily drained. In some embodiments, when Branch 2 is entered for the first time after startup of the mobile device 102, the process may proceed from 404, 406, or 408 directly to 420 so as to avoid a situation where the user 106 initiates a call before the timer has expired. On subsequent iterations, however, the timer may be monitored at 416.

At 420, upon expiration of the timer (or time period), the RAT scanner 318 may cause the mobile device 102 to utilize its cellular radio (i.e., the communication connection(s) 312) to scan for the availability of legacy (e.g., 3G/2G) radio coverage. Because there may be different types of legacy radio coverage available to the mobile device 102, decision blocks 422 and 424 evaluated.

At 422, a determination is made, based on the scan at 420, whether there is legacy coverage from a home carrier (i.e., a carrier used by the mobile device 102), or a partner of the home carrier who is in a roaming agreement with the home carrier. In other words, the determination at 422 is a determination of whether there is an available legacy RAN that the mobile device 102 is authorized (e.g., has the proper credentials) to use. If there is such a home or partner legacy RAN available at 422, the process 400 iterates back to 402, and the mobile device may continue to indicate (e.g., via the display) that it has sufficient voice coverage, and may stay camped on the LTE network cell. In this scenario, if the user 106 were to make a call using the mobile device, the mobile device 102 may invoke CSFB to establish the voice communications over the legacy RAN that the mobile device 102 is authorized to use.

If the RAT scanner 318 does not find an available home or partner legacy RAN at 422, the a determination may be made at 424 as to whether there is an available non-roaming partner legacy RAN. For example, a particular carrier may provide a legacy RAT through a cell site that is available to the mobile device, but the particular carrier may not have a roaming agreement with the home carrier that provides IMS services to the mobile device 102. In other words, the determination at 422 is a determination as to whether there is an available legacy RAN that the mobile device 102 is not authorized to use. If there is such a non-roaming partner legacy RAN, the mobile device 102 may provide, at 426, a "limited service" indicator, and the mobile device 102 may camp on the LTE network cell in a "limited service" mode, meaning that the mobile device 102 cannot make normal calls, but can still make emergency calls (e.g., E911) over the RAT system identified at 424. If, on the other hand, no legacy radio coverage is detected at both 422 and 424, the mobile device 102 may provide, at 428, a "no service" indicator to indicate that the mobile device 102 does not have voice service capabilities. The mobile device 102 may also disable an LTE radio link at 426. The process 400 may iterate from 426 and 428, depending on which route is followed from decision block 424.

An example downstream use of the timer-based scanning process of Branch 2 shown in FIG. 4 is for reducing the time and processing required for load-based handovers. For example, if, while operating in the active communications mode over an LTE RAN, the mobile device 102 determines to perform a load-based handover to a legacy RAN because the LTE network is above some threshold load, the mobile device 102 may be configured to eliminate a scanning step involved with load-based handovers if the mobile device 102 has recently traversed Branch 2 of the idle mode process 400. This may save time and processing involved with load-based handovers.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
operating a mobile device in idle mode;
establishing a long term evolution (LTE) radio link between the mobile device and a cell site within communication range of the mobile device;
evaluating one or more of a plurality of criteria comprising:
whether the mobile device is not capable of utilizing voice over long term evolution (VoLTE) for communicating with the cell site;
whether a VoLTE capability of the mobile device has been turned off; and
whether the mobile device is not capable of making a call to an emergency services telephone number using VoLTE;
in response to determining that at least one criterion of the plurality of criteria is met:
monitoring a timer to determine whether a time period has expired;
upon determining that the time period has expired, scanning for availability of legacy radio coverage from: (i) a legacy radio access network, located within a range of the mobile device, that the mobile device is authorized to use; and (ii) a legacy radio access network, located within the range of the mobile device, that the mobile device is not authorized to use;
determining, based at least in part on the scanning, that there are no legacy radio access networks located within the range of the mobile device for providing the legacy radio coverage to the mobile device;
in response to determining that there are no legacy radio access networks located within the range of the mobile device for providing the legacy radio coverage to the mobile device, providing a visual indicator on the mobile device indicating that the mobile device does not have voice service capabilities;
evaluating the one or more of the plurality of criteria;
in response to determining that the at least one criterion, or a different criterion, of the plurality of criteria is met:
restarting the timer and monitoring the timer to determine whether the time period has expired;
upon determining that the time period has expired, scanning for the availability of the legacy radio coverage from: (i) the legacy radio access network located within the range of the mobile device that the mobile device is authorized to use; and (ii) the legacy radio access network located within the range of the mobile device that the mobile device is not authorized to use;
determining that the legacy radio access network that the mobile device is not authorized to use is located within the range of the mobile device for providing the legacy radio coverage to the mobile device; and
providing another visual indicator on the mobile device indicating that the mobile device has limited voice service capabilities.

2. The computer-implemented method of claim 1, further comprising, in response to determining that there are no legacy radio access networks located within the range of the mobile device for providing the legacy radio coverage to the mobile device, disabling the LTE radio link between the mobile device and the cell site.

3. The computer-implemented method of claim 1, wherein the time period is about 10 seconds.

4. A computer-implemented method comprising:
operating a mobile device in idle mode;
establishing a long term evolution (LTE) radio link between the mobile device and a cell site within communication range of the mobile device;
determining that a voice over long term evolution (VoLTE) capability of the mobile device has been turned off to prohibit the mobile device from communicating with the cell site using VoLTE;
monitoring a timer to determine whether a time period has expired; and
upon determining that the time period has expired, scanning for availability of legacy radio coverage from: (i) a legacy radio access network located within a range of the mobile device that the mobile device is authorized to use; and (ii) a legacy radio access network located within the range of the mobile device that the mobile device is not authorized to use;
determining that there are no legacy radio access networks located within the range of the mobile device for providing the legacy radio coverage to the mobile device;
providing a visual indicator on the mobile device indicating that the mobile device does not have voice service capabilities;
restarting the timer and monitoring the timer to determine whether the time period has expired;
upon determining that the time period has expired, scanning for the availability of the legacy radio coverage from: (i) the legacy radio access network located within the range of the mobile device that the mobile device is authorized to use; and (ii) the legacy radio access network located within the range of the mobile device that the mobile device is not authorized to use;
determining that the legacy radio access network that the mobile device is not authorized to use is located within the range of the mobile device for providing the legacy radio coverage to the mobile device; and
providing another visual indicator on the mobile device indicating that the mobile device has limited voice service capabilities.

5. The computer-implemented method of claim 4, further comprising, in response to determining that there are no legacy radio access networks located within the range of the mobile device for providing the legacy radio coverage to the mobile device, disabling the LTE radio link between the mobile device and the cell site.

6. The computer-implemented method of claim 4, further comprising evaluating one or more of a plurality of criteria comprising:
   whether the mobile device is not capable of utilizing VoLTE for communicating with the cell site;
   whether the mobile device is not capable of making a call to an emergency services telephone number using VoLTE, and
   wherein the visual indicator is provided on the mobile device in response to determining that at least one criterion of the plurality of criteria are met.

7. The computer-implemented method of claim 4, wherein the monitoring the timer comprises at least one of:
   polling a remotely-located computing device to determine whether the time period has expired; or
   receiving a signal from the remotely-located computing device indicating that the time period has expired.

8. One or more non-transitory computer-readable media storing computer-executable instructions that, when executed, cause one or more processors of a mobile device to perform acts comprising:
   operating the mobile device in idle mode;
   establishing a long term evolution (LTE) radio link between the mobile device and a cell site within communication range of the mobile device;
   evaluating whether a voice over long term evolution (VoLTE) capability of the mobile device has been turned off to prohibit the mobile device from communicating with the cell site using VoLTE; and
   in response to determining that the VoLTE capability has been turned off:
      monitoring a timer to determine whether a time period has expired, wherein the monitoring the timer comprises at least one of:
         polling a remotely-located computing device to determine whether the time period has expired; or
         receiving a signal from the remotely-located computing device indicating that the time period has expired;
      upon determining that the time period has expired, scanning for availability of legacy radio coverage from a legacy radio access network;
      determining, based at least in part on the scanning, that there are no legacy radio access networks located within a range of the mobile device for providing the legacy radio coverage to the mobile device; and
      in response to the determining that there are no legacy radio access networks located within the range of the mobile device for providing the legacy radio coverage to the mobile device, providing a visual indicator on the mobile device indicating that the mobile device does not have voice service capabilities.

9. The one or more non-transitory computer-readable media of claim 8, wherein the scanning for the availability of the legacy radio coverage from the legacy radio access network comprises scanning for: (i) a legacy radio access network located within the range of the mobile device that the mobile device is authorized to use; and (ii) a legacy radio access network located within the range of the mobile device that the mobile device is not authorized to use.

10. The one or more non-transitory computer-readable media of claim 9, the acts further comprising, after providing the visual indicator on the mobile device, after restart of the timer, and in response to determining that the legacy radio access network that the mobile device is not authorized to use is located within the range of the mobile device for providing the legacy radio coverage to the mobile device, providing another visual indicator on the mobile device indicating that the mobile device has limited voice service capabilities.

11. The one or more non-transitory computer-readable media of claim 8, the acts further comprising, after providing the visual indicator on the mobile device, and after restart of the timer:
   repeating the evaluating whether the VoLTE capability has been turned off; and
   in response to determining that the VoLTE capability has been turned off, repeating the monitoring the timer and the scanning for the availability of the legacy radio coverage to determine whether the mobile device continues to not have the voice service capabilities.

12. The one or more non-transitory computer-readable media of claim 8, the acts further comprising, in response to determining that there are no legacy radio access networks located within the range of the mobile device for providing the legacy radio coverage to the mobile device, disabling the LTE radio link between the mobile device and the cell site.

13. The one or more non-transitory computer-readable media of claim 8, the acts further comprising, prior to determining that the VoLTE capability has been turned off, evaluating one or more of a plurality of criteria comprising:
   whether the mobile device is not capable of utilizing VoLTE for communicating with the cell site; and
   whether the mobile device is not capable of making a call to an emergency services telephone number using VoLTE.

* * * * *